United States Patent Office 2,854,324
Patented Sept. 30, 1958

2,854,324
FUEL OIL COMPOSITION

Kwan-Ting Shen, Brentwood, Verner L. Stromberg, Shrewsbury, and Alvin Howard Smith, Glendale, Mo., assignors to Petrolite Corporation, Wilmington, Del., a corporation of Delaware No Drawing. Application November 9, 1955
Serial No. 546,004

17 Claims. (Cl. 44—66)

See our co-pending application, Serial No. 546,003, filed November 9, 1955.

The present invention pertains to the improvement of hydrocarbon fuel. More specifically, this invention pertains to the improvement of hydrocarbon fuels, and particularly to fuel oil compositions capable of preventing or inhibiting the sludging and/or clogging tendencies generally exhibited by hydrocarbon fuels, such as those utilized in burner systems, tanks, diesel and combustion engines, and other industrial and domestic equipment. In addition, this invention relates to fuel oil compositions capable of removing preformed deleterious matter from filters, screens, and the like which deleterious matter is formed by deterioration and/or the presence of foreign bodies (e. g. water) in the fuel oils. Stabilization of color or, stated another way, prevention of color deterioration, is one of the advantages obtained by the present invention.

It is well known that the sludge which occurs in certain fuels can be prevented or inhibited by various chemical compounds of chemical products. For instance, U. S. Patent 2,559,574, dated July 3, 1951, to Weissberg, is concerned with a method of dispersing petroleum sludge which comprises bringing the surface of the sludge into contact with a solution of a minor proportion of an oil-soluble and hydrophile surface active agent.

The present invention is concerned with a fuel oil composition comprising a major portion of a hydrocarbon fuel oil and a minor amount, sufficient to stabilize the fuel oil against the formation of sludge and undesirable color bodies, of an oil-soluble and surface active chemical compound having the following characteristics: (a) at least two nitrogen atoms; (b) at least one basic nitrogen atom; (c) at least one or more repetitious alkylenoxy radicals derived from alkylene oxides having not more than 4 carbon atoms, and (d) at least one acyl radical derived from a carboxy acid having at least 8 carbon atoms for each carboxyl group present. The composition of such chemical compounds or cogeneric mixtures of the same are described subsequently in detail.

Hydrocarbon fuels which are improved in the manner herein described include not only distillate fuels but also residual fuels. For example, in regard to distillates those having a normal distillation range of from about 300° F. to about 700° F., and particularly those from about 340° F. to about 640° F., generally have a marked tendency to deteriorate under oxidizing conditions, and to form sludge. Also, the presence of impurities in such fuels, such as the presence of moisture, dispersed water, organic and/or inorganic foreign matter, and the like, causes the formation of insoluble products which tend to settle out and adhere to surface with which they come in contact, thereby in turn, causing clogging or plugging of filters, strainers, screens, conduit lines, and the like, of the equipment in which they are used. This necessitates frequent cleaning and even replacement of parts, thereby markedly decreasing the performance efficiency of various equipment which utilizes such fuel oils.

The problem of screen clogging is common, particularly in domestic fuel oil systems employing distillate fuel oils produced by distilling or cracking of petroleum, which fuels are characterized by their relatively low viscosity and other properties. Fuel oils of this type generally conform to the specifications set forth in Commercial Standards C. S. 12–40 for Nos. 1, 2 and 3, Fuel Oils. Petroleum distillates within the ranges specified and which generally do not exceed 700° F., and preferably are below 675° F., for use as diesel fuels, are further examples of the type of oils which under conditions described herein have a tendency to clog screens or filters, particularly when such fuels contain minor amounts of water dispersed therein.

Another place where screen clogging and plugging of conduit lines is encountered is in fuel oil storage tanks, which latter may be connected to burner systems or engines, etc. The stored fuel generally comes in contact with air, moisture, etc., which cause formation and precipitation of sludge materials, the latter depositing on and clogging the screens or filters used for protecting the burners or engines using such fuel oils.

It is an objective of this invention to inhibit sludging tendencies of hydrocarbon fuel oils. It is another objective to inhibit sludging and precipitation of contaminants in hydrocarbon distillate fuel oils, particularly in cracked hydrocarbon fuels. It is still another objective to provide distillate fuel oils, particularly fuel oils obtained during cracking of hydrocarbons, which fuel oils have excellent performance characteristics with respect to freedom from screen clogging, even after extensive storage under oxidizing conditions and in the presence of water. Still another objective is to provide a distillate fuel oil composition which is effective in removing preformed sludge deposits formed in fuel oil systems. Still another objective is to provide a particular type of distillate fuel oil composition or a blend thereof, which is non-corrosive, stable, and effective for removing sludge and for cleaning metal surfaces. Another objective is to inhibit the rusting tendencies of fuel oils.

The above and other objectives of this invention may be attained by dispersing, admixing with or dissolving in hydrocarbon fuel oils (which normally have a tendency to cause clogging or plugging of screens or the like), a minor amount which amount, however, is sufficient to inhibit said tendencies, of one or more surface-active hydroxy amino esters or the like and derivatives thereof. If desired, a minor amount of a detergent and/or solutizer may also be added to the composition.

The hydrocarbon distillate fuel oils in which the active ingredient and/or ingredients of this invention are dispersed or dissolved may be treated or untreated cracked fuel oils, or mixtures of cracked fuels with straight run fuel oils, said fuel oils having components normally distilling from about 300° F. to about 700° F. Preferred fuels have a boiling range of from about 340° F. to about 700° F., and particularly from about 400° F. to about 675° F. Specifically, hydrocarbon distillates which are utilized as bases in compositions of this invention are cracked gas oils, fuel oils, furnace oils, burner oils, diesel fuel oils, kerosene, etc., or mixtures of said cracked fuels with the corresponding or like straight run hydrocarbon fractions.

The additives herein employed for combination with hydrocarbon fuels are most advantageously derived from polyamines having at least 2 nitrogen atoms and may have as many as 6 or 7 nitrogen atoms, or more. At least one of the nitrogen atoms must be basic in character and it is preferable that at least three be basic in character. Such compounds can be illustrated by products obtained from commercially available polyamines such as ethylene diamine, diethylene triamine, triethylene tetramine, tetraethylene pentamine, etc., or the comparable derivatives in which the nitrogen atoms are separated by 3 carbon atoms or by 2 carbon atoms with a side chain such as a methyl group.

The acyl radical is present either in the form of an ester or in the form of an amide. If the high molal acid, for instance, a higher fatty acid, is reacted with a polyamine prior to oxyalkylation or at least with an oxyalkylated polyamine in which there is a primary or secondary amino radical, amide formation takes place with the elimination of the basicity of the amino group. Thus, if the polyamines previously noted where reacted with one mole of a higher fatty acid such as stearic acid to form the amino amides the number of basic nitrogen atoms would be one less than the number originally present. Such product could be subjected to oxyethylation by means of ethylene oxide, propylene oxide, or butylene oxide so as to yield a product of the kind herein employed. Our preference is to use either ethylene oxide alone, or propylene oxide alone, or propylene oxide in combination with ethylene oxide, or butylene oxide in combination with either propylene oxide or ethylene oxide or in combination with both. The oxyalkylation of amino amides of the kind previously described by means of the olefine oxides of the kind previously described is well known.

On the other hand, if a polyamine of the kind previously described is first subjected to oxyalkylation so there is on residual primary or secondary amino radical then acylation takes place by virtue of esterification and not by amidification. Thus, the acyl radical may be introduced either by amidfication or esterification or for that matter by using both procedures, all of which will be illustrated by subsequent examples.

The final product as such or in salt form of course must be oil-soluble as herein specified. It is to be noted that many of the products have at least 3 or more basic amino radicals and may have as many as 5 or 6. This would apply to an oxyalkylated heptamine which was subsequently converted into an ester. In a number of instances the products are improved by conversion into salts or at least partial salts, i. e., neutralization of at least part of the basicity of the compound by means of various acids including not only the acids herein specified as reactants but also other acids. The products as such or in the form of salts must be solvent-soluble, either in water, or in any organic solvent, which may be a hydrocarbon solvent, or an oxygenated solvent, or a mixture of such solvents. This applies to the product as such or the salt form as, for example, after total or partial neutralization with acetic acid, glycolic acid, lactic acid, glyconic acid, or the like. Thus, such products and the salts may be dissolved in or mixed with benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents such as pine oil, carbon tetrachloride, sulfur dioxide extract obtained in the refining of petroleums, etc., may be employed as diluents. One may use solvents having a comon solvent effect, such as the methyl, ethyl, propyl and butyl ethers of various glycols, diglycols and triglycols, such as the ethers corresponding to ethyleneglycol, diethyleneglycol, triethyleneglycol, propyleneglycol, dipropyleneglycol, tripropyleneglycol, butyleneglycol, dibutyleneglycol, tributyleneglycol, etc. Moreover, as previously pointed out one can use mixtures of one or more of these solvents but in any event the product as such, or in the salt form as noted, must be organic solvent-soluble.

In addition to the other objectives of the present invention it is also to be noted that one objective of this invention is to provide hydrocarbon fuel oils of improved stability against the formation of undesirable color bodies as well as the development and settling out of insoluble materials in storage. Furthermore, the presence of the additive in the fuel oil tends to "fluidize" old sludge deposits.

Briefly stated, then, the present invention is concerned in its preferred form with the improvement of a fuel oil by the addition of an oil-soluble and hydrophilic surface-active agent as herein described.

For purpose of convenience, what is said hereinafter will be divided in to ten parts:

Part 1 is concerned with suitable monocarboxy acids which may be used to introduce the acyl radical;

Part 2 is concerned with suitable polycarboxy acids and particularly dicarboxy acids which may be used to introduce the acyl radical;

Part 3 is concerned with suitable polyamines which may be used for amidification reactions or reaction with an olefinic oxide as hereinafter described;

Part 4 is concerned with suitable olefine oxides;

Part 5 is concerned with amidification reactions with the formation of amino amides or the like;

Part 6 is concerned with the oxyalkylation of polyamines;

Part 7 is concerned with the esterification of oxyalkylated polyamines derived in the manner described in Part 6, and represents the final form of one class of the herein described additives;

Part 8 is concerned with the oxyalkylation of amino amides obtained as described in Part 5 and represents one class of product herein employed as an additive;

Part 9 is concerned with combinations of the products described in Parts 7 and 8, preceding, with either low molal acids or high molal acids as, for example, higher fatty acids or detergent-forming acids so as to form salts; and Part 10 is concerned with the improvement of hydrocarbon fuels by means of the addition of products described in Parts 7, 8 and 9, preceding.

Reference is made elsewhere to the fact that ring formation may take place along with some other reaction such as esterification. One illustration which appears subsequently is concerned with the esterification of the addition product of one mole of diethylene triamine and five moles of ethylene oxide. When such addition product is esterified with a higher fatty acid, at least under certain circumstances, ring formation (i. e., the formation of a morpholine ring) takes place. For the sake of simplicity the reaction involving ring formation will be included in the appropriate text and particularly in Part 7 below.

PART 1

The acid which may be employed can be a high molal monocarboxy detergent-forming acid, such as a saturated or unsaturated aliphatic acid having at least 8 or not over 32 carbon atoms, a naphthenic acid, a rosin acid, an acid obtained from the oxidation of wax, or the like. Suitable acids are caprylic, capric, stearic, oleic, ricinoleic, lauric, palmitic, hydroxystearic, abietic, hydroabietic, fatty acids derived from animal or vegetable sources, for example, cocoanut oil, rapeseed oil, palm oil, olive oil, cottonseed oil, fish oils, etc. Such acids combine with soluble bases, such as caustic soda or caustic potash, to give soap or detergent-like materials.

Of particular value are high molecular weight naphthenic acids which may be used in amidification, esterification or salt formation. Particularly desirable is the type of material sold by the Sun Oil Company under the trade name "Sunaptic Acids." These are essentially high molecular weight naphthenic acids corresponding to the formula $C_{21}H_{36}O_2$ and corresponding to a molecular weight of 320 and a theoretical acid number of 175.

Although many of the examples herein described are derivatives of high molal acids for the reason that such radical adds oil solubility as well as other desirable characteristics, it is to be emphasized in the broadest aspect the present invention includes the use of low molal acids such as acetic acid, glycolic acids, lactic acid, butyric acid, phthalic anhydride, benzoic acid, diglycolic acid and the like. Products obtained from such low molal acids are of definite interest as such and also as admixtures of similar derivatives derived from high molal acids.

PART 2

There are available a substantial number of dicarboxy acids which are suitable for use in preparing the herein described compounds. The particular dicarboxy acids are characterized by the presence of at least one hydrocarbon group containing at least 8 carbon atoms. Such characterization of the hydrocarbon group, of course, excludes carboxylic carbon atoms.

Dicarboxy acids may have as many as 32 carbon atoms and even more, particularly when derived by the oxidation of wax or by other procedures as subsequently noted. Common well known dicarboxy acids having 8 carbon atoms or more (excluding carboxyl group carbon atoms) are sebacic acid, methylene disalicyclic acid, etc. It is interesting that several of the higher dicarboxylic acids, such as $HOOC-(CH_2)_{17-19}-COOH$, have been found as glycerides in japan wax.

Other well known types of dibasic acids are those derived from maleic anhydride and are known as adduct acids. Examples are the products obtained by reaction between maleic anhydride and terpenes to yield well known adduct acids having the hydrophobe characterization above described. Monocarboxy acids, such as sorbic acid, can be reacted in a comparable manner with an unsaturated fatty acid such as linolenic acid to give a suitable reactant. Other types can be obtained from compounds comparable to Clocker adducts involving addition next to an unsaturated bond but not involving the bond as such, as for example where oleic acid is used as one of the initial reactants. Sometimes the production of the adduct acid yields as an initial stage the anhydride. Obviously the anhydride can be reacted with water to give the parent acid.

A variety of dimerized fatty acids have been obtained and are described in the patent literature. See, for example, U. S. Patent No. 2,417,739, dated March 18, 1947, to De Groote, and more particularly U. S. Patent No. 2,632,695, dated March 24, 1953, to Landis et al.

An analogous variety of dicarboxy acids are obtained from abietic acid or the like and generally referred to as dimerized rosin acids. Dimerized acids have been obtained from fish oil fatty acids in which the total number of carbon atoms may have varied from 20 to 24 and thus the dimerized acids may have as many as 44, or even more, carbon atoms. The same applies to certain dimerized acids obtained from the oxidation of wax. Furthermore, esters of dimerized acids have been reacted with aromatic materials such as alkylated or polyalkylated naphthelene in the presence of aluminum chloride, or the like, to yield dicarboxy acids having as many as 50 carbon atoms.

Referring to a consideration of dimeric fatty acids one may illustrate this structure by the following composition:

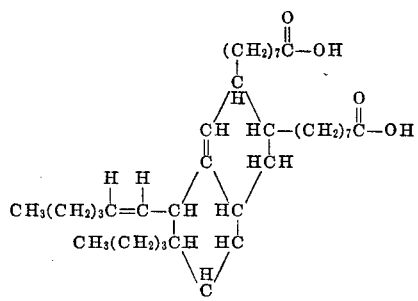

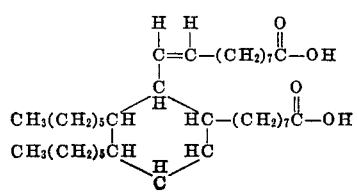

The acids produced commercially run approximately 85% or better dimer content with some trimer and some monomer. As pointed out in aforementioned U. S. Patent No. 2,632,695, a well-known source of these dimeric acids is the product sold by Emery Industries, Inc., and said to be dilinoleic acid. In the literature published by the Emery Industries, Inc., the properties of this product are given as follows:

| | |
|---|---|
| Neutral equivalent | 290–310. |
| Iodine value | 80–95. |
| Color | Gardner 12 (max.). |
| Dimer content | Approx. 85%. |
| Trimer and higher | Approx. 12%. |
| Monomer | Approx. 3%. |

PART 3

The polyamines herein employed must have at least one reactive hydrogen atom and if the acyl radical is present as an amide group then at least 2 reactive hydrogen atoms. This can be illustrated very simply by reference to ethylene diamine and its derivatives. If three of the amino hydrogen atoms in ethylene diamine were replaced by a methyl group, for example, such product could be oxyalkylated and then esterified to yield a product of the kind herein described. On the other hand, if such product were subjected to amidification unless the acyl radical happened to carry a reactive hydrogen atom as possible in the case of ricinoleic acid, such product would not necessarily be susceptible to oxyalkylation. However, if only 2 hydrogen atoms had been replaced by a methyl group obviously amidification and oxyalkylation could be conducted by conventional procedure. It happens that almost invariably substituted polyamines (other than substituted polyamines obtained by oxyalkylation) are more expensive than the precursory compound. For instance, alkylated polyamines are much more expensive than the parent polyamines. It is understood that conventional substituent groups may be present in the polyamines such as alkyl radicals having less than 8 carbon atoms, cyclohexyl radicals, benzyl radicals, morpholine radicals, furfuryl radicals, or the like, provided such substituents if present do not have more than 8 uninterrupted carbon atoms. From a practical standpoint and also from the standpoint of brevity, what is said herein is concerned largely with the unsubstituted polyamines.

One may use polyamines corresponding to the formula

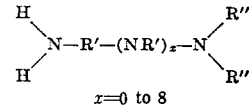

$x=0$ to 8 in which $R''$ is hydrogen, alkyl, cycloalkyl, aryl, or aralkyl and $R'$ is a divalent radical such as

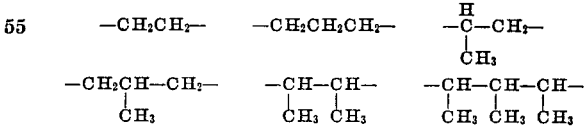

Stated another way, the polyamines have at least one primary amino group separated from another primary or secondary amino group by 2 to 4 carbon atoms. Examples of suitable amines include:

Ethylenediamine
Diethylenetriamine
Triethylenetetramine
Tetraethylenepentamine
Propylenediamine
Dipropylenetriamine
Tripropylenetetramine
Butylenediamine
Aminoethylpropylenediamine
Aminoethylbutylenediamine

Other polyamines in which the nitrogen atoms are separated by a carbon atom chain having 4 or more carbon atoms include the following: Tetramethylenediamine, pentamethylenediamine, and especially hexamethylenediamine. The latter is of particular interest because the product is commercially available in light of its use in the manufacture of synthetic fibre.

If desired, one can prepare a variety of reactants having two or more amino groups and at least one hydroxyl group. One may use modifications of procedures or the procedures themselves as described in U. S. Patents Nos. 2,046,720, dated July 7, 1936, to Bottoms; 2,048,990, dated July 28, 1936, to Britton et al.; 2,447,821, dated August 24, 1948, to Sankus; and 1,985,885, dated January 1, 1935, to Bottoms. Examples include the following:

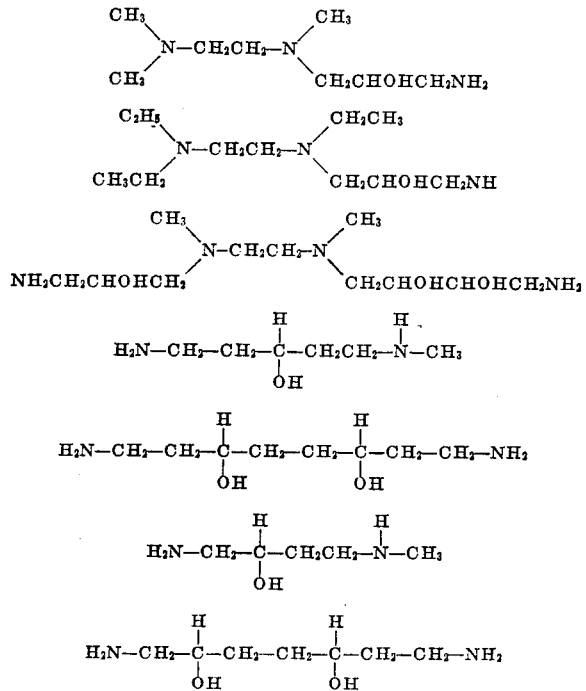

Other suitable amines and somewhat related amines are exemplified by ethylenebisoxypropylamine,

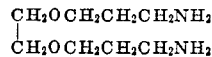

and derivatives obtained by treating ethylenebisoxypropylamine with 1, 2, 3 or 4 moles of ethylene oxide, propylene oxide, butylene oxide, or the like.

Other compounds including those having cyclic structures include piperazine, and the corresponding derivatives obtained by treating piperazine with alkylene oxides. The same applies to substituted piperazine such as the 2,5-dimethylpiperazine.

As to mono-substituted dialkanol piperazine see U. S. Patent No. 2,421,707, dated June 3, 1947, to Malkemus.

As has been suggested by previous examples an amine can be subjected to oxyalkylation, then esterified and subjected to further oxyalkylation.

Actually, it has been found that in a number of instances polyamines in which there is a cyclic radical, for instance, a morpholine radical, give particularly effective products for use in the present invention. These amines may be purchased in the open market or may be obtained by the oxyalkylation of available polyamines or by oxyalkylation followed by dehydration (ring formation). Furthermore, certain oxyalkylated polyamines free from any cyclic structure, for instance, an amine obtained by reacting one mole of diethylene triamine with 5 moles of ethylene oxide when esterified with a higher fatty acid or the like, may yield during the esterification process an additional mole of water over and above the mole of water obtained by esterification. This additional mole of water undoubtedly is the result of ring formation, such as the formation of a morpholine radical or equivalent. Polyamines having at least one cyclic radical and suitable for the present purpose are illustrated by the following compounds:

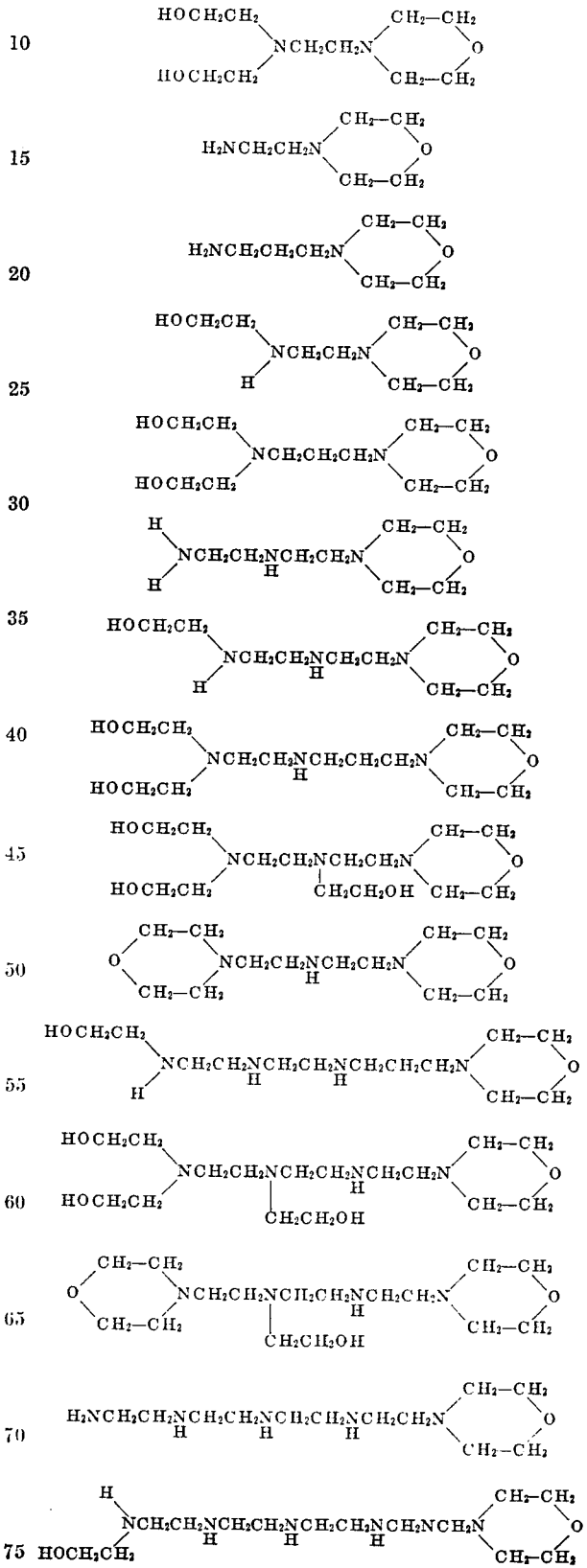

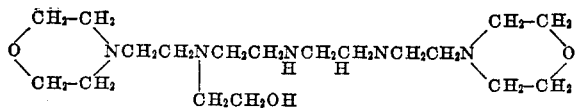
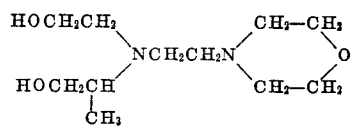
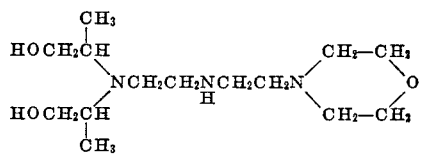
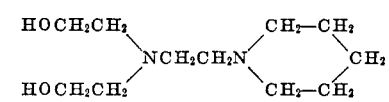
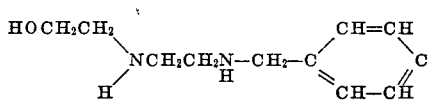
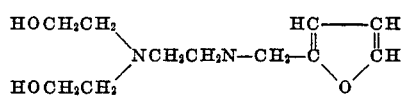
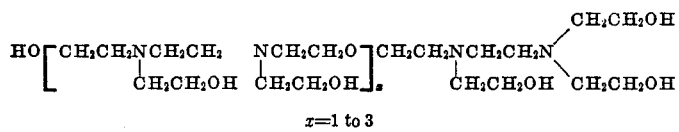
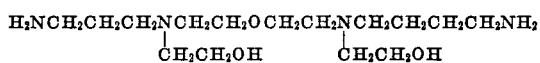
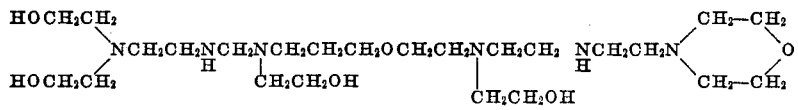
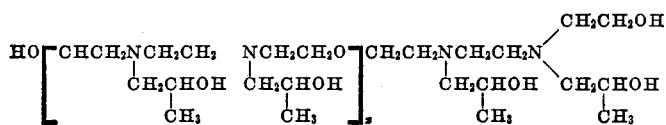
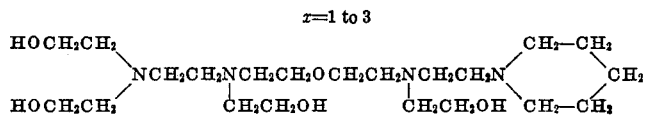

| U. S. Patent No. | Dated | Inventor |
|---|---|---|
| 2,443,067 | June 8, 1948 | Robert J. Burns. |
| 2,448,515 | Nov. 15, 1949 | Sherman et al. |
| 2,524,219 | Oct. 3, 1950 | Bersworth. |
| 2,525,770 | Oct. 17, 1950 | Cook et al. |
| 2,528,274 | Oct. 31, 1950 | Gunderson. |
| 2,534,441 | Dec. 19, 1950 | Do. |
| 2,588,343 | Mar. 11, 1952 | Bird et al. |
| 2,588,345 | do | Do. |
| 2,609,380 | Sept. 2, 1952 | Goldstein et al. |

The following examples illustrate the preparation of amino amides. Such procedure is well known and is conventional.

Example 1a

The monostearic acid amide of diethylene triamine was prepared by allowing 284 pounds of stearic acid to react with 103 pounds of diethylene triamine in the presence of sufficient xylene to maintain a pot temperature of 160° C. at reflux. The reaction was conducted in a stainless steel reaction vessel equipped with agitator, cooling and heating coils, temperature controlling reflux and distillate recovery system, and the usual inlets and outlets. The reaction was allowed to proceed until the theoretical quantity of water, 18 pounds, had been removed. This required approximately 6 hours. The reaction mixture was then allowed to cool, giving a semi-solid brown mush.

Example 2a

The mono-palmitic acid amide of ethylene diamine was prepared using the reactor and conditions as outlined above except that the reaction mixture was refluxed for one hour before any attempt was made to separate water of reaction. The palmitic acid, 256 pounds, was added to 70.1 pounds of ethylene diamine (85%), and the reaction allowed to proceed as outlined.

Example 3a

The amide from 146 pounds of triethylene tetramine and 300 pounds of Emery dimeric acid was prepared in the reaction vessel, described in Example 1a, using the conditions described therein.

Example 4a

The mono-amide from 74 pounds of propylene diamine and 256 pounds of palmitic acid was prepared using conditions as outlined in Example 2a, using the reaction vessel as described in Example 1a.

PART 4

As previously stated the olefine monoxides are those which have 4 carbon atoms or less, thus including ethylene oxide, propylene oxide, butylene oxide, glycide and methyl-glycide. Our preference is to use butylene oxide, propylene oxide, and ethylene oxide and particularly certain combinations as previously noted. Reference to butylene oxide is concerned with the straight chain isomers and particularly with commercial butylene oxide which is a mixture of the straight chain isomers with little or no isobutylene oxide present.

PART 5

The amidification of basic polyamines produces amino amides or the like and is well known. This has been thoroughly described in the literature. See, for instance, the following U. S. Patents:

Example 5a

The monostearic acid amide of methyl aminopropylamine was prepared from 88 pounds of amine and 284 pounds of acid, using the conditions and reactor as outlined in Example 1a.

Example 6a

The monolauric acid amide of diethylene triamine was prepared from 103 pounds of amine and 200 pounds of acid using the conditions and reactor as outlined in Example 1a.

Example 7a

The monopalmitic acid amide of triethylene tetramine was prepared from 146 pounds of amine and 256 pounds of acid using the conditions and reactor as outlined in Example 1a.

The preceding examples and other examples are presented in tabular form in Table I, immediately following:

TABLE I

| Ex. No. | Acid | Lbs. of acid | Amine | Lbs. of amine | Temp., °C. | Reaction time, hrs. |
|---|---|---|---|---|---|---|
| 1a | Stearic | 284 | Diethylene triamine | 103 | 160 | 6 |
| 2a | Palmitic | 256 | Ethylene diamine | 70 | 160 | 4 |
| 3a | Dimeric | 300 | Triethylene tetramine | 146 | 160 | 7 |
| 4a | Palmitic | 256 | Propylene diamine | 74 | 160 | 4 |
| 5a | Stearic | 284 | Methylaminopropylamine | 88 | 160 | 6 |
| 6a | Lauric | 200 | Diethylene triamine | 103 | 160 | 6 |
| 7a | Palmitic | 256 | ...do... | 103 | 160 | 6 |
| 8a | Abietic | 302 | Ethylene diamine | 70 | 160 | 7 |
| 9a | Hydroxy-stearic | 300 | Methylaminopropylamine | 88 | 160 | 6 |
| 10a | Capric | 172 | Hexamethylene diamine | 116 | 160 | 4 |
| 11a | Coconut oil | 210 | Diethylene triamine | 103 | 160 | 6 |
| 12a | Olive oil | 286 | Aminoethyl propylene diamine | 117 | 160 | 7 |
| 13a | Aliphat 33-F | 300 | Propylene diamine | 74 | 160 | 4 |
| 14a | Soyabean | 288 | Triethylene tetramine | 146 | 160 | 5 |
| 15a | Ricinoleic | 298 | Ethylene diamine | 70 | 160 | 4 |

PART 6

The oxyalkylation of polyamines and particularly basic polyamines has been thoroughly described in the literature; in fact, the procedure is substantially the same as the oxyalkylation of basic monoamines. Such procedure is illustrated in the following patents:

| U. S. Patent No. | Dated | Inventor |
|---|---|---|
| 2,586,770 | Feb. 26, 1952 | Alm. |
| 2,642,412 | June 16, 1953 | Newey et al. |
| 2,644,760 | July 7, 1953 | Schroeder. |
| 2,679,510 | May 25, 1954 | De Groote. |
| 2,679,511 | ...do... | Do. |
| 2,679,512 | ...do... | Do. |
| 2,679,513 | ...do... | Do. |
| 2,679,514 | ...do... | Do. |
| 2,679,515 | ...do... | Do. |

The oxyalkylation of the polyamines may involve as many as 30 moles of the monoepoxide per mole of amine. One may use a single oxide such as ethylene oxide, propylene oxide, butylene oxide, or the like, or one may use a mixture as, for example, propylene oxide and ethylene oxide, or butylene oxide and ethylene oxide.

The procedure employed for oxyalkylating an amino amide of the kind described herein is in essence the same as the procedure described for the oxyalkylation of a polyamine or, for that matter, an amide having one or more reactive hydrogen atoms. This also is true in such instances where an oxyalklated product is combined with an acid such as a higher fatty acid and then subjected to further oxyalkylation. All such procedures are well known and require no description beyond what is available in the literature.

Purely by way of illustration a number of examples are included illustrating the oxyalkylation of polyamines:

Example 1b

Into a stainless steel oxyalkylator was charged 130 pounds of diethylene triamine. The reactor consisted of a closed pressure type vessel, with turbine agitator, gas inlet tube, cooling and heating coils, and the usual inlets and outlets. After flushing the reactor with nitrogen, the contents were reacted up to 125° C. At this point, 220 pounds of ethylene oxide were passed into the contents beneath the turbine via the gas inlet tube. About 2.5 hours were required to complete the reaction. During the oxyethylation the temperature was held at 125° C. and a maximum pressure of 25 p. s. i. g. developed. The product was a medium viscous, light brown liquid when cool.

Example 2b

Into the afore described oxyalkylator were charged 103 pounds of an amine called "9–10 amine." This amine is made by the Matheson Olin Company and is primarily a crude diethylene triamine. As in Example 1b, preceding, ethylene oxide was gradually admitted at 125° C. When 198 pounds of the oxide had been added, the reaction rate was almost zero. About 4 hours were required to reach this point, and the batch was stirred one more hour after the oxide addition was stopped before cooling it down. The product was similar to that of Example 1b, but slightly darker.

Example 3b

Example 1b was repeated. At the end of the reaction, the batch was cooled, and .1 pound of powdered sodium hydroxide added. An additional 132 pounds of ethylene oxide was then added at 125° C. 1.5 hours were required.

Example 4b 103 pounds of diethylene triamine were reacted with 290 pounds of propylene oxide. Since no catalyst was used, about 6 hours at 125° C. was required to complete the reaction. The product was similar in appearance to that of Example 1b.

Example 5b

Into the reaction vessel described in Example 1b was charged 60 pounds of anhydrous ethylene diamine, 176 pounds of ethylene oxide was added over a 4-hour period at 125° C.

Example 6b

Another batch of Example 5b was made. To this was added 0.1 pound of powdered sodium hydroxide. 176 pounds of ethylene oxide were added over a 2.5 hour period at 125° C.

Example 7b

Example 5b was repeated except that 456 pounds of propylene oxide were used, instead of ethylene oxide. The reaction was carried out in the same manner, i. e., two stages.

Example 8b 146 pounds of triethylene tetramine were reacted with 220 pounds of ethylene oxide over a 3-hour period at 125° C. The maximum pressure was 22 p. s. i. g.

Example 9b

Example 8b was repeated. To this batch was added 0.1 pound of powdered sodium hydroxide. An additional 220 pounds of ethylene oxide were added at 125° C. About 2 hours were required to complete the reaction.

Example 10b

Example 8b was repeated using propylene oxide in place of ethylene oxide. 290 pounds of oxide were added in 6 hours at 125° C.

Example 11b 74 pounds of anhydrous propylene diamine were reacted with 352 pounds of ethylene oxide. The oxide was added in two stages, i. e., the first half at 125° C. with no catalyst present, and the second half at 125° C. with 0.1 pound sodium hydroxide present. A total addition time of 7 hours was required.

Example 12b 88 pounds of N-methylaminopropylamine were reacted with 264 pounds of ethylene oxide. 0.05 pound of sodium hydroxide had been added as catalyst. The reaction was completed in 3 hours at 125° C.

Example 13b

To 103 pounds of diethylene triamine was added a mixture of alkylene oxides composed of 88 pounds of ethylene oxide and 116 pounds of propylene oxide. About 5 hours were required to complete the reaction at 125° C.

Example 14b

A three-stage oxyalkylation of triethylene tetramine, 146 pounds, was conducted at 125° C. In the first stage, 290 pounds of propylene oxide were added in 7 hours. In the second stage, 0.2 pound of sodium hydroxide catalyst was used, and an additional 290 pounds of propylene oxide added. In the final stage, 176 pounds of ethylene oxide were added. The product was a light colored, medium viscous liquid.

Example 15b

To 60 pounds of ethylene diamine were added 360 pounds of butylene oxide. 0.1 pound of sodium hydroxide was used as catalyst. The reaction took 10 hours at 125° C. To this product then were added 220 pounds of ethylene oxide over a 4-hour period.

Example 16b 232 pounds of propylene oxide were added to 74 pounds of anhydrous propylene diamine. About 5 hours were required at 125° C., 20 p. s. i. g. After addition of 0.05 pound of sodium hydroxide, 176 pounds of ethylene oxide were added over a 3-hour period.

Example 17b

To 146 pounds of triethylene tetramine were added 176 pounds of ethylene oxide. 4 hours at 125° C. were required for the addition. 0.05 pound of sodium hydroxide were then added and 116 pounds of propylene oxide added in 2 hours.

Example 18b

To a batch of product as made in Example 4b were added 176 pounds of ethylene oxide. 0.05 pound of sodium hydroxide was added as catalyst for this second stage of oxyalkylation. The reaction took 3 hours at 125° C.

The above examples, together with other examples, are summarized in Table II, immediately following:

TABLE II

| Ex. No. | Amine | Lbs. of amine | Oxide | Lbs. of oxide | Temp., °C. | Catalyst | Reaction time, hrs. |
|---|---|---|---|---|---|---|---|
| 1b | Diethylene triamine | 130 | Ethylene | 220 | 125 | | 2.5 |
| 2b | "9-10 amine" | 103 | do | 198 | 125 | | 5 |
| 3b | Diethylene triamine | 130 | do | 352 | 125 | Sodium hydroxide | 4 |
| 4b | do | 103 | Propylene | 290 | 125 | | 6 |
| 5b | Ethylene diamine | 60 | Ethylene | 176 | 125 | | 4 |
| 6b | do | 60 | do | 352 | 125 | Sodium hydroxide | 6.5 |
| 7b | do | 60 | Propylene | 456 | 125 | do | 6.5 |
| 8b | Triethylene tetramine | 146 | Ethylene | 220 | 125 | | 3 |
| 9b | do | 146 | do | 440 | 125 | Sodium hydroxide | 5 |
| 10b | do | 146 | Propylene | 290 | 125 | | 6 |
| 11b | Propylene diamine | 74 | Ethylene | 352 | 125 | | 7 |
| 12b | N-methylaminopropylamine | 88 | do | 265 | 125 | Sodium hydroxide | 3 |
| 13b | Diethylene triamine | 103 | {Ethylene / Propylene} | {88 / 116} | 125 | | 5 |
| 14b | Triethylene tetramine | 146 | {Propylene / Ethylene} | {580 / 176} | 125 | Sodium hydroxide | |
| 15b | Ethylene diamine | 60 | Butylene | 360 | 125 | do | 10 |
| 16b | Propylene diamine | 74 | {Propylene / Ethylene} | {232 / 176} | 125 | do | 8 |
| 17b | Triethylene tetramine | 146 | {Ethylene / Propylene} | {176 / 116} | 125 | do | 6 |
| 18b | Diethylene triamine | 103 | {Propylene / Ethylene} | {290 / 176} | 125 | do | 9 |
| 19b | {Diethylene triamine / Triethylene tetramine} | {65 / 73} | Ethylene / Propylene | {176 / 145} | 125 | do | 7 |
| 20b | Hexamethylenediamine | 116 | Ethylene | 176 | 125 | | 5 |

PART 7

The acylation and more particularly the esterification of oxyalkylated polyamines, i. e., amino alcohols, is well known and has been described in the literature, particularly in the patent literature. See, for example, the following patents:

| U. S. Patent No. | Date | Inventor |
|---|---|---|
| 2,626,912 | Jan. 27, 1953 | De Groote. |
| 2,626,915 | do | Do. |
| 2,626,917 | do | Do. |
| 2,626,918 | do | Do. |
| 2,626,919 | do | Do. |
| 2,662,857 | Dec. 15, 1953 | Carroll. |
| 2,568,743 | Sept. 25, 1951 | Kirkpatrick. |
| 2,568,747 | do | Do. |
| 2,525,770 | Oct. 17, 1950 | Cook. |

It is not believed any description is necessary but by way of example the following are included:

Example 1c

Into a stainless steel reaction vessel with turbine agitator, cooling and heating coils, temperature controller, reflux and distillate recovery system, and the usual inlets and outlets, was placed the product of the reaction described in Example 1b, followed by 284 pounds of stearic acid. Sufficient xylene was then added to maintain a pot temperature of 160° C. at reflux. Reflux, with water separation and stirring, was maintained until 18 pounds of water had been removed. This required approximately 6 hours. The brown viscous liquid then was allowed to cool and adjusted to 50% activity by the addition of xylene.

*Example 2c*

Using the reaction vessel and conditions as described in Example 1c, the monoester of the material produced in Example 2b was prepared with 300 pounds of General Mills' fatty acid "Aliphat 33F." This is a distilled cottonseed fatty acid. The product was a brown viscous liquid and it and all following preparations were adjusted to 50% activity with xylene.

*Example 3c*

Using conditions and vessel as described in Example 1c the product produced in Example 3b was esterified with 300 pounds of Emery dimeric acid. The product was a brown viscous oil.

*Example 4c*

Using all conditions as in Example 1c, except the initial charge was the product of reaction Example 4b and stearic.

*Example 5c*

Using all conditions as in Example 1c, except the initial charge was the product of Reaction 5b and stearic. The reaction was continued until 36 pounds of water had been removed which required approximately 10 hours.

*Example 6c*

The product of Example 6b was esterified with 256 pounds of palmitic acid using conditions described in Example 1c.

*Example 7c*

The product of Example 7b was esterified with 200 pounds of lauric acid using Example 1c conditions.

*Example 8c*

The product of Example 8b was esterified with 200 pounds of lauric acid and refluxing continued until 54 pounds of water had been removed. This required approximately 24 hours.

*Example 9c*

The product of Example 9b was esterified with 302 pounds of abietic acid using Example 1c conditions.

*Example 10c*

The product of Example 1b was esterified with 298 pounds of ricinoleic acid using Example 1c conditions.

*Example 11c*

The product of Example 11b was esterified with 256 pounds of palmitic acid using Example 1c conditions.

*Example 12c*

The product of Example 12b was esterified with 284 pounds of stearic acid using 1c conditions.

*Example 13c*

The product of Example 13b was esterified with 300 pounds of General Mills "Aliphat 33F." Refluxing was continued until 36 pounds of water had been removed. This required approximately 12 hours.

*Example 14c*

The product of Example 14b was esterified with 298 pounds of ricinoleic acid using 1c conditions,

*Example 15c*

The product of Example 15b was esterified with 256 pounds of palmitic acid using 1c conditions.

*Example 16c*

The product of Example 16b was esterified with 256 pounds of palmitic acid using 1c conditions.

*Example 17c*

The product of Example 17b was esterified with 200 pounds of lauric acid using Example 1c conditions. Refluxing was continued until 54 pounds of water had been removed. This required approximately 24 hours.

*Example 18c*

The product of Example 18b was esterified with 256 pounds of palmitic acid using 1c conditions. Refluxing was continued unitil 36 pounds of water had been removed.

*Example 19c*

The reaction was run exactly as 1c except refluxing was continued until 36 pounds of water had been removed. The removal of water required approximately 15 hours.

*Example 20c*

The product of Example 1b was esterified with 300 pounds of Emery dimeric acid using conditions as in 1c, except that refluxing was continued until 36 pounds of water had been removed.

The above examples are summarized in Table III, immediately following:

TABLE III

| Ex. No. | Amino alcohol | Wt., lbs. | Acid | Wt., lbs. | Temp. ° C. | Reaction time, hrs. |
|---|---|---|---|---|---|---|
| 1c | 1b | 350 | Stearic | 284 | 160 | 6 |
| 2c | 2b | 301 | "Aliphat 33–F" | 300 | 160 | 6 |
| 3c | 3b | 482 | Dimeric | 300 | 160 | 6 |
| 4c | 4b | 393 | Stearic | 284 | 160 | 6 |
| 5c | 5b | 236 | Stearic | 284 | 160 | 10 |
| 6c | 6b | 412 | Palmitic | 256 | 160 | 6 |
| 7c | 7b | 516 | Lauric | 200 | 160 | 6 |
| 8c | 8b | 366 | Lauric | 200 | 160 | 24 |
| 9c | 9b | 586 | Abietic | 302 | 160 | 6 |
| 10c | 1b | 350 | Ricinoleic | 298 | 160 | 6 |
| 11c | 11b | 426 | Palmitic | 256 | 160 | 6 |
| 12c | 12b | 353 | Stearic | 284 | 160 | 6 |
| 13c | 13b | 307 | "Aliphat 33–F" | 300 | 160 | 12 |
| 14c | 14b | 902 | Ricinoleic | 298 | 160 | 6 |
| 15c | 15b | 420 | Palmitic | 256 | 160 | 6 |
| 16c | 16b | 482 | Palmitic | 256 | 160 | 6 |
| 17c | 17b | 438 | Lauric | 200 | 160 | 24 |
| 18c | 18b | 569 | Palmitic | 256 | 160 | 24 |
| 19c | 1b | 350 | Stearic | 284 | 160 | 15 |
| 20c | 1b | 350 | Dimeric | 300 | 160 | 18 |

PART 8

As is well known, the oxyalkylation of amino amides is substantially the same as the oxyalkylation of the polyamines which have not been previously subjected to amidification. Such oxyalkylation procedures have been discussed in the literature. Although no description is required, purely by way of illustration the following examples are included:

*Example 1d*

The entire batch of amide from Example 1a was melted and run into an oxyalkylator. The oxyalkylator was a stainless steel pressure vessel equipped with turbine agitator, heating and cooling coils, a gas inlet tube, and the usual inlets and outlets. The amide was catalyzed with 0.1 pound powdered sodium hydroxide and brought up to 125° C. 220 pounds of ethylene oxide were slowly run into the batch over a 3-hour period. The maximum pressure developed was 25 p. s. i. g. A sample was taken, and the product was still a semi-solid mush.

*Example 2d*

Example 1d was continued by passing in an additional 220 pounds of ethylene oxide. The reaction took 35 hours and was conducted at 125° C. The product was a viscous, brown liquid.

Example 3d

The product from Example 2a was allowed to react with 220 pounds of ethylene oxide over a 3 hour period at 125° C. The reaction was catalyzed by 0.1 pound of sodium hydroxide. The product was similar to that of Example 1d.

Example 4d

Another batch of amide from Example 2a, repeated, was oxyalkylated. This time 290 pounds of propylene oxide were added over a 4-hour period.

Example 5d

The product of Example 3a was treated with 440 pounds of ethylene oxide over a 6-hour period at 125° C. The maximum pressure of 30 p. s. i. g. was reached. It was necessary to use 0.2 pound of sodium hydroxide catalyst. The product was a semi-solid mush at room temperature.

Example 6d

The entire batch from Example 4a was treated with 176 pounds of ethylene oxide in 3 hours. 0.1 pound catalyst was employed at 125° C.

Example 7d 264 pounds of ethylene oxide were added to the product of Example 5a. The oxide was added at 125° C. over a 4-hour period, with 0.1 pound sodium hydroxide present as catalyst.

Example 8d

The lauric amide of Example 6a was catalyzed with 0.1 pound sodium methylate and reacted up to 125° C. 464 pounds propylene oxide were then added over a 3-hour period, followed by 220 pounds of ethylene oxide over a 3-hour period. The maximum pressure was 30 p. s. i. g.

Example 9d

The entire batch from Example 1a, repeated, was reacted with 1440 pounds butylene oxide followed by 660 pounds ethylene oxide. 1.5 pounds sodium methylate were used as catalyst at 125° C. The reaction times were 20 hours and 6 hours, respectively. Although the reaction was started in the oxyalkylator mentioned in Example 1a, it was carried out for the most part in a vessel of semi-plant size. The product was transferred to the larger vessel when 250 pounds of butylene oxide had been added.

Example 10d

The product of Example 7a was treated with 720 pounds butylene oxide over an 8 hour period. This was followed by addition of 440 pounds of ethylene oxide over a 5-hour period. 0.5 pound of sodium methylate were used as catalyst. A transfer from smaller to larger vessel (as in Example 9d) was made to accommodate the size of the final batch.

The previous examples, along with other examples, are summarized in Table IV, immediately following:

TABLE IV

| Ex. No. | Amide | Wt., lbs. | Oxide | Wt., lbs. | Temp. °C. | Catalyst | Reaction time hrs. |
|---|---|---|---|---|---|---|---|
| 1d | 1a | 369 | Ethylene | 220 | 125 | Sodium hydroxide | 3 |
| 2d | 1a | 369 | ....do.... | 440 | 125 | ....do.... | 35 |
| 3d | 2a | 308 | ....do.... | 220 | 125 | ....do.... | 3 |
| 4d | 2a | 308 | Propylene | 290 | 125 | | 4 |
| 5d | 3a | 428 | Ethylene | 440 | 125 | Sodium hydroxide | 6 |
| 6d | 4a | 312 | ....do.... | 176 | 125 | ....do.... | 3 |
| 7d | 5a | 354 | ....do.... | 264 | 125 | ....do.... | 4 |
| 8d | 6a | 285 | Propylene / Ethylene | 464 / 220 | 125 | Sodium methylate | 6 |
| 9d | 1a | 369 | Butylene / Ethylene | 1,440 / 660 | 125 | ....do.... | 26 |
| 10d | 7a | 341 | Butylene / Ethylene | 720 / 440 | 125 | ....do.... | 13 |
| 11d | 8a | 354 | Ethylene | 220 | 125 | ....do.... | 3 |
| 12d | 9a | 378 | Propylene | 290 | 125 | | 4 |
| 13d | 10a | 270 | Propylene / Ethylene | 290 / 264 | 125 | Sodium methylate | 6 |
| 14d | 11a | 295 | Propylene / Ethylene | 464 / 220 | 125 | ....do.... | 6 |
| 15d | 14a | 416 | Propylene | 290 | 125 | | 4 |

PART 9

As previously pointed out, compounds of the type herein described obtained in a general way by reactions involving acylation and oxyalkylation yield suitable products for the use herein specified. Such products are inherently basic in character. Their effectiveness is not limited to the use of the free (anhydro) base as such but it is possible in actual use that combination with water present may or may not form the hydrated base. Similarly, these materials may combine with acidic materials present in the fuels. Furthermore, such products, i. e., the free base, can be converted into the salt form and in many instances yield a product having greater solubility in oil or some other desirable property. Reference to salt formation means either partial or total salt formation insofar that it is not necessary in all instances to neutralize all the basic nitrogen atoms or, for that matter, one might neutralize in part with one acid and in part with other acids. The acids employed for salt formation need not necessarily be acids which enter acylation reactions in the manner described, i. e., need not necessarily be carboxy acids but may be acids in which the sulfo radical appears such as sulfonic acid, particularly oil-soluble sulfonic acid comparable to those obtained from mahogany soaps or may be sulfonic acid such as obtained by sulfation of high molal alcohols or the like. Examples of salt formation are illustrated by Examples Nos. 1e to 5e, immediately following:

Example 1e

To the product described in Example 1d, were added 30 pounds of glacial acetic acid. This mixture was agitated in a blending tank for one hour at 50° C. A partial salt was formed which was still a liquid, soluble in No. 2 fuel oils.

Example 2e

The product of Example 3a was blended with 74 pounds of propionic acid at 50° C. About one hour blending was allowed for the neutralization to be complete.

Example 3e

The product of Example 1c was reacted with 76 pounds of glycolic acid. The reaction was carried out in a blend tank at 60° C. over a one-hour period. The resultant product was a partial amine salt.

Example 4e

The product of Example 6c was treated with 50 pounds of lauric acid. The partial neutralization was carried out as in Example 1e.

Example 5e

The product of Example 17c was treated with 30 pounds of acetic acid as in Example 1e.

Additional samples, including some in which oil-soluble petroleum sulfonic acids or other oil-soluble sulfonic acids have been used, are included in Table V, following. Such oil-soluble sulfonic acids include among others sulfonic acids obtained from keryl benzene foots, from dinonylphenol foots, and from detergent alkylate foots. Similarly, sulfonic acids obtained from di(dodecyl)benzene may be used. Sulfonic acids having a carboxyl radical also may be used, such as sulfo phenyl stearic acid.

TABLE V

| Ex. No. | Compound | Wt. lbs. | Acid | Wt. lbs. | Temp. °C. | Reaction time, hrs. |
|---|---|---|---|---|---|---|
| 1e | 1d | 589 | Acetic | 30 | 50 | 1 |
| 2e | 3d | 528 | Propionic | 74 | 50 | 1 |
| 3e | 1c | 616 | Glycolic | 76 | 60 | 1 |
| 4e | 6c | 650 | Lauric | 50 | 50 | 1 |
| 5e | 17c | 584 | Acetic | 30 | 50 | 1 |
| 6e | 8d | 969 | Didodecyl benzene sulfonate | 300 | 50 | 1 |
| 7e | 15d | 541 | Sulfo-phenyl stearic acid | 245 | 50 | 2 |
| 8e | 8c | 548 | Dinonylphenol-foots sulfonate | 295 | 50 | 2 |
| 9e | 13c | 589 | Mahogany sulfonate | 225 | 50 | 1 |
| 10e | 5d | 868 | Keryl benzene foots sulfonate | 350 | 50 | 2 |

PART 10

Part 10 is concerned with the improvement of hydrocarbon fuels by the addition of compounds of the kind described, for example, in Parts 7, 8 and 9 preceding, to fuel oils in order to improve their properties.

Another property which additives contribute to fuel oil is the property of rust inhibition. It has been noted previously that moisture collects in fuel tanks for an obvious reason. As a corollary thereto it follows that moisture in an iron container usually results in rusting or formation of a ferric coating which, for practical purposes, can be considered rusting. Actually, in the lower or water phase resulting from the collection of water in the bottom of a tank, one accumulates rust whereas in the upper oil phase not only rust may appear but also some other characteristic change which sometimes is referred to as a blister.

Particular additives herein described contribute valuable rust inhibiting properties to the fuel oil. An ordinary steel plate was suspended in 100 cc. of oil for one week. The oils which were used had been shaken with water in a typical demulsification test procedure. Rust was determined by observation. The degree of rust in the various test is rated from 1 to 5. As one can expect, the additives which gave pronounced demulsifying effects and thus eliminated the bulk of water from the fuel oil likewise in many instances were the most effective in antirusting action. It should be noted, however, that there are additives which have pronounced effectiveness as demulsifying agents but still for some obscure reason do not produce nearly as effective results in rust inhibition. The results are included in the following table:

TABLE VI.—RUST INHIBITING PROPERTIES

An ordinary steel plates was suspended in 100 cc. of oil for one week. The additive treated oil had been shaken with 10 cc. of water before immersing the plate. Rust was determined by observation.

The degree of rusting is rated from 1 to 5 which includes:

(1) No rust
(2) Few spots
(3) Fair condition—rust occurring
(4) Poor—much rust
(5) Very poor—entire plate corroded

[#2 domestic heating oil "A"]

| Additive | Conc., p. p. m., 100% activity | Rating | |
|---|---|---|---|
| | | Oil phase | Water phase |
| None | | 5 | 5 |
| 2c | 35 | 1 | 1 |
| 2c | 70 | 1 | 1 |
| 2c | 150 | 1 | 1 |
| 4c | 35 | 1 | 2 |
| 4c | 70 | 1 | 2 |
| 4c | 150 | 1 | 1 |
| 9c | 35 | 2 | 3 |
| 9c | 70 | 1 | 3 |
| 9c | 150 | 1 | 1 |
| 11c | 35 | 3 | 2 |
| 11c | 70 | 2 | 1 |
| 11c | 150 | 2 | 1 |
| 14c | 35 | 1 | 2 |
| 14c | 70 | 1 | 1 |
| 14c | 150 | 1 | 1 |
| 19c | 35 | 1 | 2 |
| 19c | 70 | 1 | 1 |
| 19c | 150 | 1 | 1 |
| 1d | 35 | 2 | 2 |
| 1d | 70 | 2 | 2 |
| 1d | 150 | 2 | 2 |
| 8d | 35 | 3 | 4 |
| 8d | 70 | 2 | 3 |
| 8d | 150 | 2 | 3 |
| 7d | 35 | 3 | 2 |
| 7d | 70 | 2 | 1 |
| 7d | 150 | 2 | 1 |
| 3e | 35 | 2 | 2 |
| 3e | 70 | 2 | 1 |
| 3e | 150 | 1 | 1 |

In previous tests reference was made to oil which was a domestic heating oil indicated as "A." In tests following, two oils were used. The second oil which has been indicated as domestic heating oil is "B." The most desirable property that an additive can contribute to fuel oil is the prevention of solids or sludges, and thus eliminate solids which act as screen-clogging precipitates. Needless to say, if a filter were used instead of a screen it means the prevention of precipitates or solids which would clog the filter. Stated another way, the additive prevents sludge formation, tar formation and the like. No effort is made to differentiate between formation of sludge and preventing its precipitation by acting as a suspending agent or an anti-flocculent. A number of methods have been employed but one that has been established and has been frequently accepted is the procedure employed which the Shell Chemical Company in Bulletin SC 51–31 refers to as "The Small Scale Screen-Clogging Test."

PROPERTIES AS FUEL OIL INHIBITORS

These tests were run according to Shell Chemical Company bulletin Small Scale Test.

An oil is "passed" if its flow decrease is less than 20% and its filter rating is "2" or less. In the test, the oil is steamed, aged at 194° F. for 16 hours and then passed through a screen at a constant flow head. The flow decrease, due to sediment or emulsion forming on the screen is noted over a half-hour period. The residue from the ageing bottle is filtered, and the filter stain rated as follows:

(1) No stain
(2) Slight stain
(3) Dark stain
(4) Heavy stain
(5) Very heavy stain with actual sediment particles present The data obtained by these tests are shown in Table VII immediately following.

TABLE VII

| Additive | Conc., p. p. m., 100% activity | Heating oil "A" | | Heating oil "B" | |
|---|---|---|---|---|---|
| | | % decrease | Filter | % decrease | Filter |
| None | | 100 | 5 | 100 | 3 |
| 2c | 75 | 3.5 | 1 | 4 | 1 |
| 2c | 150 | 2.5 | 1 | 3.4 | 1 |
| 3c | 75 | 10.1 | 3 | 9.3 | 2 |
| 3c | 150 | 8.3 | 2 | 7.5 | 1 |
| 4c | 75 | 7.8 | 3 | 10.1 | 2 |
| 4c | 150 | 5.4 | 1 | 8.7 | 1 |
| 9c | 75 | 7.3 | 5 | 10.8 | 3 |
| 9c | 150 | 5.8 | 4 | 10.7 | 3 |
| 11c | 75 | 5.5 | 2 | 6.0 | 1 |
| 11c | 150 | 4.2 | 1 | 5.3 | 1 |
| 14c | 75 | 7.9 | 3 | 8.3 | 2 |
| 14c | 150 | 6.1 | 3 | 7.4 | 1 |
| 19c | 75 | 5.5 | 2 | 8.1 | 2 |
| 19c | 150 | 4.9 | 2 | 5.6 | 1 |
| 1d | 75 | 18.7 | 3 | 15.1 | 2 |
| 1d | 150 | 12.4 | 2 | 13.9 | 1 |
| 7d | 75 | 10.8 | 2 | 15.4 | 2 |
| 7d | 150 | 8.2 | 1 | 9.7 | 2 |
| 3e | 75 | 4.4 | 3 | 5.6 | 2 |
| 3e | 150 | 3.8 | 2 | 5.1 | 2 |

It is to be noted that stabilization of hydrocarbon fuel as herein described may be accomplished within a low range of approximately 0.0025% to about 0.005%. On the other hand, in numerous instances it is desirable to use distinctly higher range as for example an amount of additive equal to 0.001 to 5% by weight of the fuel oil. See aforementioned U. S. Patent 2,553,183 and also U. S. Patent 2,711,947, dated June 28, 1955, to Smith et al. In actual use it is our preference generally to employ derivatives of the kind herein employed in 40 p. p. m. to 500 p. p. m. or ratios of 0.004% to 0.05%. It is convenient to make a solution of the additives such as a 25% or 50% solution in some suitable solvent such as high boiling aromatic solvent or the like and add a solution purely for convenience in measurement.

TABLE VIII.—COLOR STABILIZING PROPERTIES

The fuel oil, having free access to the air, containing the additive in the concentration indicated, was aged for two days at a temperature of 200° F. The oil was then allowed to cool and the color of the oil measured in terms of the "Tag-Robinson Colorimeter Number." Number 21 equals water white, Number 1 is black.

| Additive | Conc., p. p. m., 100% activity | Colorimeter number | |
|---|---|---|---|
| | | Domestic heating oil A initial color 17.5 | Domestic heating oil B initial color 15 |
| None | | 1 | 3 |
| 2c | 35 | 12 | 10 |
| 2c | 70 | 14 | 11.5 |
| 2c | 150 | 14 | 12 |
| 3c | 35 | 10 | 8 |
| 3c | 70 | 10 | 10 |
| 3c | 150 | 11 | 10 |
| 4c | 35 | 8 | 10 |
| 4c | 70 | 9 | 10.25 |
| 4c | 150 | 10 | 12 |
| 9c | 35 | 6 | 6.5 |
| 9c | 70 | 6 | 8 |
| 9c | 150 | 9 | 8 |
| 11c | 35 | 11.25 | 8 |
| 11c | 70 | 13 | 10 |
| 11c | 150 | 14 | 9.5 |
| 14c | 35 | 8 | 7.25 |
| 14c | 70 | 11.25 | 9.5 |
| 14c | 150 | 12 | 11 |
| 19c | 35 | 8.5 | 6 |
| 19c | 70 | 9.25 | 8.75 |
| 19c | 150 | 10 | 10.5 |
| 1d | 35 | 5 | 8.25 |
| 1d | 70 | 7.25 | 8.25 |
| 1d | 150 | 8 | 9.5 |
| 7d | 35 | 7 | 7 |
| 7d | 70 | 9 | 9 |
| 7d | 150 | 9 | 9 |
| 3e | 35 | 8.25 | 9.25 |
| 3e | 70 | 9.5 | 9.75 |
| 3e | 150 | 10.25 | 10.5 |

Having thus described our invention, what we claim as new and desire to obtain by Letters Patent, is:

1. A fuel oil composition comprising a major portion of a hydrocarbon fuel oil and a minor portion, sufficient to stabilize the fuel oil against the formation of sludge and undesirable color bodies, of a member of the class consisting of (A) an oil soluble and surface-active chemical compound selected from the group consisting of oxyalkylated acylated polyamines formed by oxyalkylating with an alkylene monoepoxide an amidification product of a polyamine with a carboxy acid and oxyalkylated acylated polyamines formed by esterifying an alkylene monoepoxide oxyalkylated polyamine with a carboxy acid, and which compound has the following structural elements and characteristics: (a) at least 2 nitrogen atoms; (b) at least one basic nitrogen atom; (c) at least one alkyleneoxy radical derived from alkylene monoepoxide having not more than 4 carbon atoms, and (d) at least one acyl radical derived from a carboxy acid having at least 8 carbon atoms for each carboxyl group present; and (B) acid addition salts thereof.

2. A fuel oil composition comprising a major portion of a hydrocarbon fuel oil and a minor portion, sufficient to stabilize the fuel oil against the formation of sludge and undesirable color bodies, of a member of the class consisting of (A) an oil-soluble and surface-active chemical compound selected from the group consisting of oxyalkylated acylated polyamines formed by oxyalkylating with an alkylene monoepoxide an amidification product of a polyamine with a carboxy acid and oxyalkylated acylated polyamines formed by esterifying an alkylene monoepoxide oxyalkylated polyamine with a carboxy acid, and which compound has the following structural elements and characteristics: (a) at least 2 nitrogen atoms; (b) at least one basic nitrogen atom; (c) at least one alkyleneoxy radical derived from alkylene monoepoxide having not more than 4 carbon atoms, and (d) at least one acyl radical derived from a monocarboxy acid having at least 8 carbon atoms; and (B) acid addition salts thereof.

3. A fuel oil composition comprising a major portion of a hydrocarbon fuel oil and a minor portion, sufficient to stabilize the fuel oil against the formation of sludge and undesirable color bodies, of a member of the class consisting of (A) an oil-soluble and surface-active chemical compound selected from the group consisting of oxyalkylated acylated polyamines formed by oxyalkylating with an alkylene monoepoxide an amidification product of a polyamine with a carboxy acid and oxyalkylated acylated polyamines formed by esterifying an alkylene monoepoxide oxyalkylated polyamine with a carboxy acid, and which compound has the following structural elements and characteristics: (a) at least 2 nitrogen atoms; (b) at least one basic nitrogen atom; (c) at least two alkyleneoxy radicals derived from alkylene monoepoxide having not more than 4 carbon atoms, and (d) at least one acyl radical derived from a monocarboxy acid having at least 8 carbon atoms; and (B) acid addition salts thereof.

4. A fuel oil composition comprising a major portion of a hydrocarbon fuel oil and a minor portion, sufficient to stabilize the fuel oil against the formation of sludge and undesirable color bodies, of a member of the class consisting of (A) an oil-soluble and surface-active chemical compound selected from the group consisting of oxyalkylated acylated polyamines formed by oxyalkylating with an alkylene monoepoxide an amidification product of a polyamine with a carboxy acid and oxyalkylated acylated polyamines formed by esterifying an alkylene monoepoxide oxyalkylated polyamine with a carboxy acid, and which compound has the following structural elements and characteristics: (a) at least 2 nitrogen atoms; (b) at least one basic nitrogen atom; (c) at least two alkyleneoxy radicals derived from alkylene monoepoxide having not more than 4 carbon atoms, and (d) at least one acyl radical derived from a monocarboxy acid having at least 8 carbon atoms; and (B) salts thereof, with the proviso that the surface-active chemical compound be free from any acyl radical having less than 8 carbon atoms.

5. A fuel oil composition comprising a major portion of a hydrocarbon fuel oil and a minor portion, sufficient to stabilize the fuel oil against the formation of sludge and undesirable color bodies, of a member of the class consisting of (A) an oil-soluble and surface-active chemical compound selected from the group consisting of oxyalkylated acylated polyamines formed by oxyalkylating with an alkylene monoepoxide an amidification product of a polyamine with a carboxy acid and oxyalkylated acylated polyamines formed by esterifying an alkylene monoepoxide oxyalkylated polyamine with a carboxy acid, and which compound has the following structural elements and characteristics: (a) at least 2 nitrogen atoms; (b) at least 2 basic nitrogen atoms; (c) at least 2 alkyleneoxy radicals derived from alkylene monoepoxide having not more than 4 carbon atoms, and (d) at least one acyl radical derived from a monocarboxy acid having at least 8 carbon atoms; and (B) acid addition salts thereof.

6. The composition of claim 5 with the proviso that the acyl radical having at least 8 carbon atoms is present as part of an amide radical.

7. A fuel oil composition comprising a major portion of a hydrocarbon fuel oil and a minor portion, sufficient to stabilize the fuel oil against the formation of sludge and undesirable color bodies, of (A) an oil-soluble and surface-active chemical compound selected from the group consisting of oxyalkylated acylated polyamines formed by oxyalkylating with an alkylene monoepoxide an amidification product of a polyamine with a carboxy acid and oxyalkylated acylated polyamines formed by esterifying an alkylene monoepoxide oxyalkylated polyamine with a carboxy acid, and which compound has the following structural elements and characteristics: (a) at least 2 nitrogen atoms; (b) at least two basic nitrogen atoms; (c) at least two alkyleneoxy radicals derived from alkylene monoepoxide having not more than 4 carbon atoms; (d) at least one acyl radical derived from a monocarboxy acid having at least 8 carbon atoms, and said acyl radical being present as part of an amide radical.

8. A fuel oil composition comprising a major portion of a hydrocarbon fuel oil and a minor portion, sufficient to stabilize the fuel oil against the formation of sludge and undesirable color bodies, of (A) an oil-soluble and surface-active chemical compound selected from the group consisting of oxyalkylated acylated polyamines formed by oxyalkylating with an alkylene monoepoxide an amidification product of a polyamine with a carboxy acid and oxyalkylated acylated poylamines formed by esterifying an alkylene monoepoxide oxyalkylated poylamine with a carboxy acid, and which compound has the following structural elements and characteristics: (a) at least 2 nitrogen atoms; (b) at least two basic nitrogen atoms; (c) at least two alkyleneoxy radicals derived from alkylene monoepoxide having not more than 4 carbon atoms; (d) one acyl radical derived from a monocarboxy acid having at least 8 carbon atoms, and said acyl radical being present as part of an amide radical.

9. The composition of claim 8 with the proviso that the acyl radical be derived from a detergent-forming acid.

10. The composition of claim 8 with the proviso that the acyl radical be derived from a high molecular weight naphthenic acid.

11. A fuel oil composition comprising a major portion of a hydrocarbon fuel oil and a minor portion, sufficient to stabilize the fuel oil against the formation of sludge and undesirable color bodies, of (A) an oil-soluble and surface-active chemical compound selected from the group consisting of oxyalkylated acylated poylamines formed by oxyalkylating with an alkylene monoepoxide an amidification product of a polyamine with a carboxy acid and oxyalkylated acylated polyamines formed by esterifying an alkylene monoepoxide oxyalkylated polyamine with a carboxy acid, and which compound has the following structural elements and characteristics: (a) at least 2 nitrogen atoms; (b) at least two basic nitrogen atoms; (c) at least two alkyleneoxy radicals derived from alkylene monoepoxide having not more than 4 carbon atoms; (d) one acyl radical derived from a monocarboxy acid having at least 8 carbon atoms, and said acyl radical being present as part of an amide radical; (e) one acyl radical derived from a high molecular weight naphthenic acid of the formula $C_{21}H_{36}O_2$; said naphthyl radical being present as part of an amide radical.

12. The composition of claim 11 with the proviso that the amino nitrogen atoms be a residue of a polyethyleneamine.

13. The composition of claim 11 with the proviso that the amino nitrogen atoms be a residue of ethylene diamine.

14. The composition of claim 11 with the proviso that the amino nitrogen atoms be a residue of diethylene triamine.

15. The composition of claim 11 with the proviso that the amino nitrogen atoms be a residue of triethylene tetramine.

16. The composition of claim 11 with the proviso that the amino nitrogen atoms be a residue of tetraethylene pentamine.

17. The composition of claim 11 with the proviso that the amino nitrogen atoms be a residue of pentaethylenehexamine.

References Cited in the file of this patent

UNITED STATES PATENTS

| | | |
|---|---|---|
| 2,187,823 | Ulrich et al. | Jan. 23, 1940 |
| 2,375,529 | De Groote et al. | May 8, 1945 |
| 2,609,931 | Rodman et al. | Sept. 9, 1952 |
| 2,681,354 | Kelley et al. | June 15, 1954 |